United States Patent
Yoshida et al.

(10) Patent No.: US 11,961,134 B2
(45) Date of Patent: Apr. 16, 2024

(54) PROPOSAL SYSTEM, METHOD, AND COMPUTER-READABLE STORAGE MEDIUM FOR STORING PROGRAM

(71) Applicant: Canon Kabushiki Kaisha, Tokyo (JP)

(72) Inventors: Masataka Yoshida, Saitama (JP); Misato Furuya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 17/123,605

(22) Filed: Dec. 16, 2020

(65) Prior Publication Data

US 2021/0192598 A1 Jun. 24, 2021

(30) Foreign Application Priority Data

Dec. 19, 2019 (JP) ................................. 2019-229382

(51) Int. Cl.
*G06Q 30/0601* (2023.01)
*G06N 3/045* (2023.01)
*G06N 3/08* (2023.01)
*G06Q 30/016* (2023.01)
*G06Q 30/0201* (2023.01)

(52) U.S. Cl.
CPC ......... *G06Q 30/0631* (2013.01); *G06N 3/045* (2023.01); *G06N 3/08* (2013.01); *G06Q 30/016* (2013.01); *G06Q 30/0201* (2013.01)

(58) Field of Classification Search
CPC ............. G06Q 30/0631; G06Q 30/016; G06Q 30/0201; G06N 3/0454; G06N 3/08; G06N 3/063; G06N 3/084
See application file for complete search history.

(56) References Cited

U.S. PATENT DOCUMENTS

| | | | | |
|---|---|---|---|---|
| 2010/0262467 | A1* | 10/2010 | Barnhill, Jr. | ........ H04L 41/0253 707/E17.057 |
| 2013/0028616 | A1* | 1/2013 | Kunihiro | ............... G06F 3/1204 399/81 |
| 2014/0279206 | A1* | 9/2014 | Ishizu | ................ G06Q 30/0631 705/26.7 |
| 2017/0091838 | A1* | 3/2017 | Cunico | .............. G06Q 30/0282 |
| 2019/0303993 | A1* | 10/2019 | Anandaiah Shetty Nagaraja ....... G06Q 30/0269 |

FOREIGN PATENT DOCUMENTS

| | | |
|---|---|---|
| JP | 2003271801 A | 9/2003 |
| JP | 2008225629 A | 9/2008 |

OTHER PUBLICATIONS

Qiu, J., Lin, Z. & Li, Y. Predicting customer purchase behavior in the e-commerce context. Electron Commer Res 15, 427-452 (Year: 2015).*

(Continued)

*Primary Examiner* — Resha Desai
*Assistant Examiner* — Patrick Kim
(74) *Attorney, Agent, or Firm* — Venable LLP (57) ABSTRACT

In the proposal system, sales performance information that is related to a device is acquired and information that is related to a usage situation of a device is accepted from a customer. A device to be a purchase target is inferred by a learned model based on the information that is related to the usage situation of the device and the sales performance information, and then a proposal information is outputted as a result of that inference.

12 Claims, 7 Drawing Sheets

(56) References Cited

OTHER PUBLICATIONS

Qiu et al., Predicting Customer Purchase Behavior in the E-Commerce Context, Electron Commer Res 15, 427-452 (Year: 2015).*
Japanese Office Action dated Nov. 6, 2023 in counterpart Japanese Patent Appln. No. 2019-229382.

* cited by examiner

OVERALL EXTERNAL VIEW

FIG. 3B

TOP EXTERNAL VIEW

PROPOSAL SYSTEM, METHOD, AND COMPUTER-READABLE STORAGE MEDIUM FOR STORING PROGRAM

BACKGROUND OF THE INVENTION

Field of the Invention

The present invention is related to a proposal system, a method, and a computer-readable storage medium for storing a program for estimating and proposing a device to be a purchase target.

Description of the Related Art

When a buyer tries to buy a new printer, because a large number of products are sold even just for household printers, it is difficult for the buyer to determine which printer, when compared against the buyer's usage situation, is the most appropriate to purchase. In Japanese Patent Laid-Open No. 2003-271801 a method for presenting a new product that should be purchased to replace the electronic product that a customer is currently using based on the usage information of the customer who is using the product is described.

However, a method such as in Japanese Patent Laid-Open No. 2003-271801 in which a new product is presented based only on the usage information of a customer would propose a new product on an assumption that the customer would use the product in the future as he/she used the product in the past. Accordingly, in a case where a customer is trying to purchase a new product at a timing when a usage situation changes from an existing one, it may not be possible to propose information for a new product.

SUMMARY OF THE INVENTION

The present invention provides a proposal system, a method, and a computer-readable storage medium for storing a program for proposing information as appropriate in accordance with the change of a usage situation.

The present invention in one aspect provides a proposal system, comprising: a first acquisition unit configured to acquire sales performance information that is related to a device; an acceptance unit configured to accept information that is related to a usage situation of a device from a customer; an inference unit configured to infer a device to be a purchase target by a learned model based on the information that is related to the usage situation of the device that was accepted by the acceptance unit and the sales performance information that was acquired by the first acquisition unit; and an output unit configured to output as proposal information a result of the inference by the inference unit.

By virtue of the present invention, information can be proposed appropriately in accordance with a change of a usage situation.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

[Configuration of Processing System]

Figure 1:
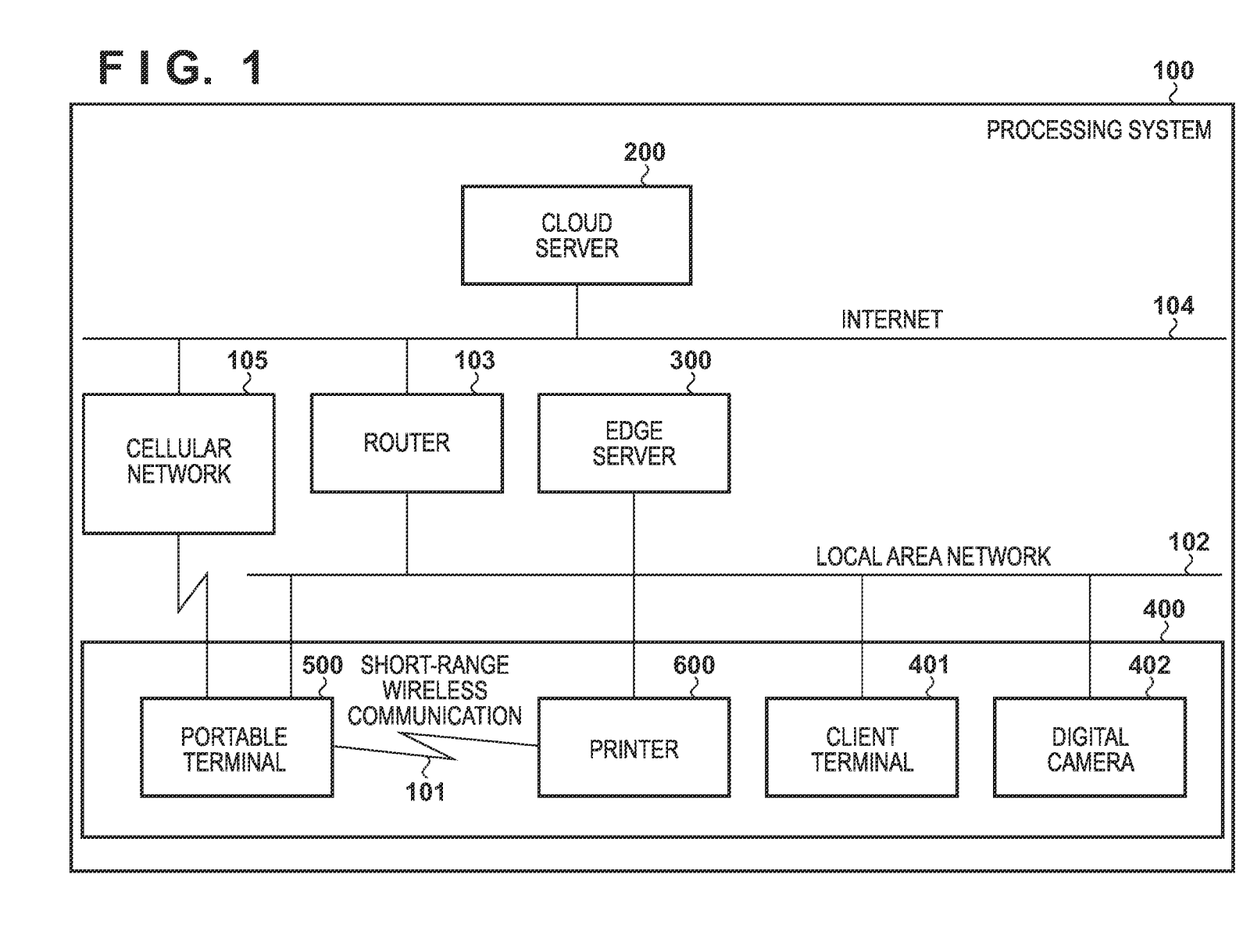
FIG. 1 is a view that illustrates a configuration of a processing system.

FIG. 1 is a view that illustrates a configuration of a processing system 100 in the present embodiment. The processing system 100 is a proposal system that estimates a new printer to be a purchase target based on a customer's printer usage situation so far and purchase information that is related to other users who, in that printer usage situation, purchased a new printer, and proposes the result to the customer. A system 100 is a system that includes a cloud server 200, an edge server 300, and a device group 400, and each device is connected via a network. In FIG. 1, a local area network 102 and the Internet 104 are examples of the network. The local area network 102 and the Internet 104 are networks that include a wireless communication network, a wired communication network, or both. Also, although the edge server 300 is connected to the local area network 102 in FIG. 1, it may be connected to the Internet 104.

The device group 400 includes various devices that can perform a network connection. For example, the device group 400 includes a portable terminal 500 such as a smartphone, a printer 600, a client terminal 401 such as a personal computer and a work station, and a digital camera 402. However, a device that is included in the device group 400 is not limited to these types and may be a home electric appliance such as a refrigerator, a television, and an air conditioner, for example. The device group 400 is connected so that the respective devices are able to communicate with each other by the local area network 102 and can connect to the Internet 104 via a router 103 that is installed in the local area network 102.

In FIG. 1, the router 103 is illustrated as a device that connects the local area network 102 and the Internet 104. The router 103 may have a wireless LAN access point function that configures the local area network 102. In such a case, each device in the device group 400 can connect to the local area network 102 by connecting to an access point by a wireless LAN aside from connecting to the router 103 by the wired LAN. For example, a configuration may be taken so that the printer 600 and the client terminal 401 are connected by the wired LAN and the portable terminal 500 and the digital camera 402 are connected by the wireless LAN. The device group 400 and the edge server 300 can communicate mutually with the cloud server 200 via the Internet 104 to which they are connected via the router 103.

The edge server 300 and the device group 400 can communicate with each other via the local area network 102.

The respective devices of the device group 400 can communicate with each other via the local area network 102. Also, the portable terminal 500 and the printer 600 can communicate by short-range wireless communication 101. As the short-range wireless communication 101, wireless communication that is compliant with a Bluetooth (registered trademark) standard and an NFC standard, for example, is used. Also, the portable terminal 500 is connected with a cellular network 105 and can communicate with the cloud server 200 via the cellular network 105.

The configuration of the processing system 100 indicates an example, and another configuration may be used. For example, although an example in which the router 103 comprises an access point function was described above, the access point may be configured as a device that is different from the router 103. Also, the connection between the edge server 300 and the device group 400 may be something that uses a configuration of connection aside from the local area network 102. For example, the connection may be something that uses wireless communication such as near-field wireless communication, Bluetooth, ZigBee, and a LPWA aside from a wireless LAN; a wired connection such as a USB; infrared communication; and the like.

[Configuration of Server]

Figure 2:
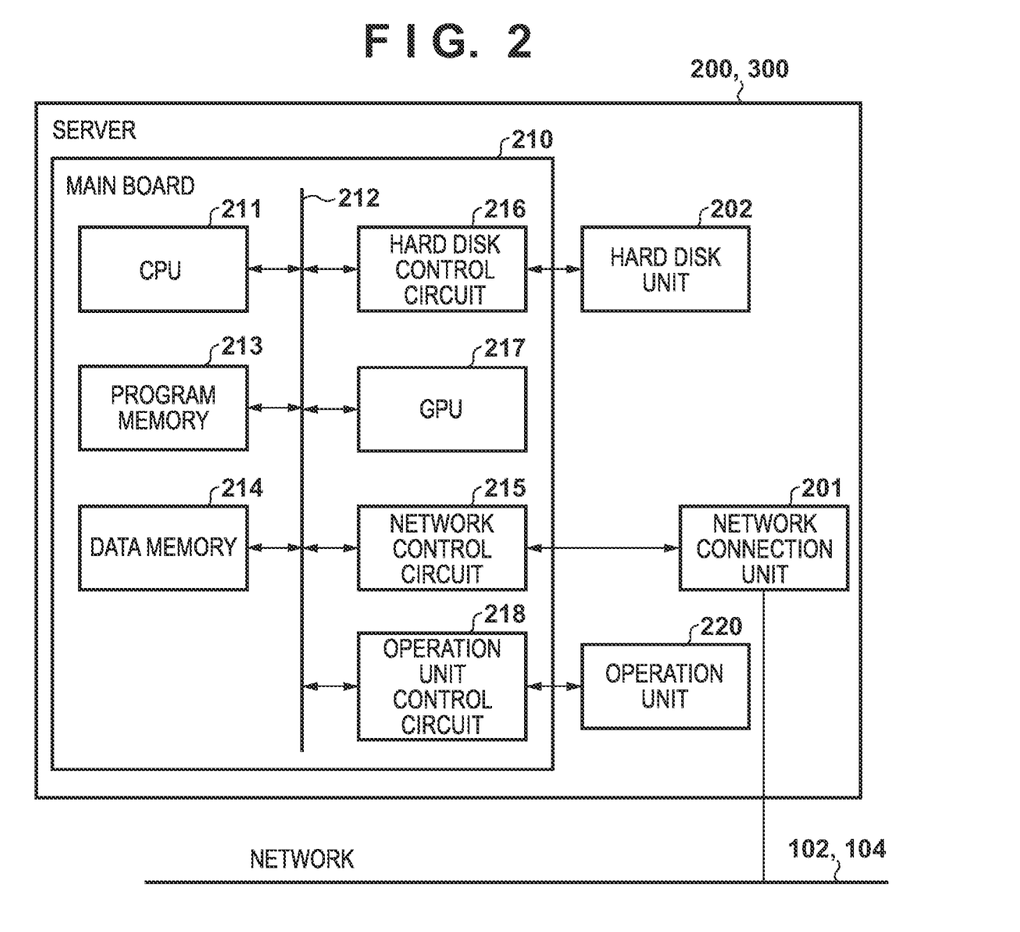
FIG. 2 is a block diagram that illustrates a configuration of a server.

FIG. 2 is a block diagram that illustrates a configuration of the cloud server 200 and the edge server 300. FIG. 2 illustrates a hardware configuration that is common between the cloud server 200 and the edge server 300. The cloud server 200 and the edge server 300 include a main board 210 that performs the comprehensive control of each device as a whole, a network connection unit 201, and a hard disk unit 202.

A CPU 211 in the form of a microprocessor that is arranged on the main board 210 operates based on a control program and data that are stored respectively in a program memory 213 and a data memory 214 to which the CPU 211 is connected via an internal bus 212. The operation of each device (the cloud server 200 and the edge server 300) in the present embodiment is achieved by the CPU 211 executing a program that is stored in the program memory 213 with reference to data that is stored in the data memory 214, for example.

The CPU 211 connects to a network such as the Internet 104 and the local area network 102 by controlling the network connection unit 201 via a network control circuit 215 and then performs communication with another device. The CPU 211 executes data read/write operations to and from the hard disk unit 202 to which the CPU 211 is connected via a hard disk control circuit 216. In the hard disk unit 202, an operating system (OS) that is loaded in the program memory 213 and then executed, control software of the cloud server 200 and the edge server 300, and various data are stored. Also, in the hard disk unit 202 of the edge server 300, a learned model 352 that will be described later is stored. Also, in the hard disk unit 202 of the cloud server 200, a learning model 252 that will be described later is stored. The CPU 211 performs display of various user interfaces and of a state of a device on an operation unit 220 by controlling an operation unit control circuit 218 and accepts an operation from a user.

A GPU 217 can execute various computation processing in place of the CPU 211. Because the GPU 217 can execute efficiently the calculation of parallel processing of data, in a case where deep learning is performed using a mathematical model such as a neural network, for example, processing is executed by the GPU 217. In the present embodiment, in the learning processing by a learning unit 251 that will be described later, the CPU 211 and the GPU 217 are used. For example, in a case where a learning program that includes the learning model is executed, learning is performed by the CPU 211 and the GPU 217 cooperating to perform a calculation. However, in the processing of the learning unit 251, configuration may be such that the processing is performed only by the CPU 211 or the GPU 217. Also, regarding an inference (estimation) unit 351 that will be described later, the CPU 211 and the GPU 217 may be used as in the learning unit 251.

Also, the configuration in FIG. 2, although described to be common between the cloud server 200 and the edge server 300, is not limited to a common configuration. For example, a configuration may be taken so that although the GPU 217 is provided in the cloud server 200, the GPU 217 is not provided in the edge server 300 or a configuration may be taken so that the GPU 217 of a different capability is provided.

[Appearance of Printer]

Figure 3A:
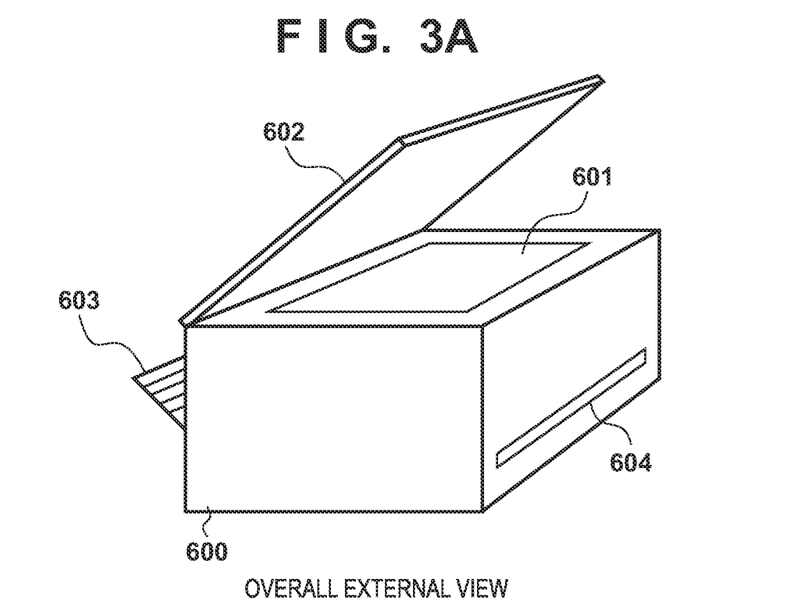
FIG. 3A and FIG. 3B are external views of a printer.
Figure 3B:
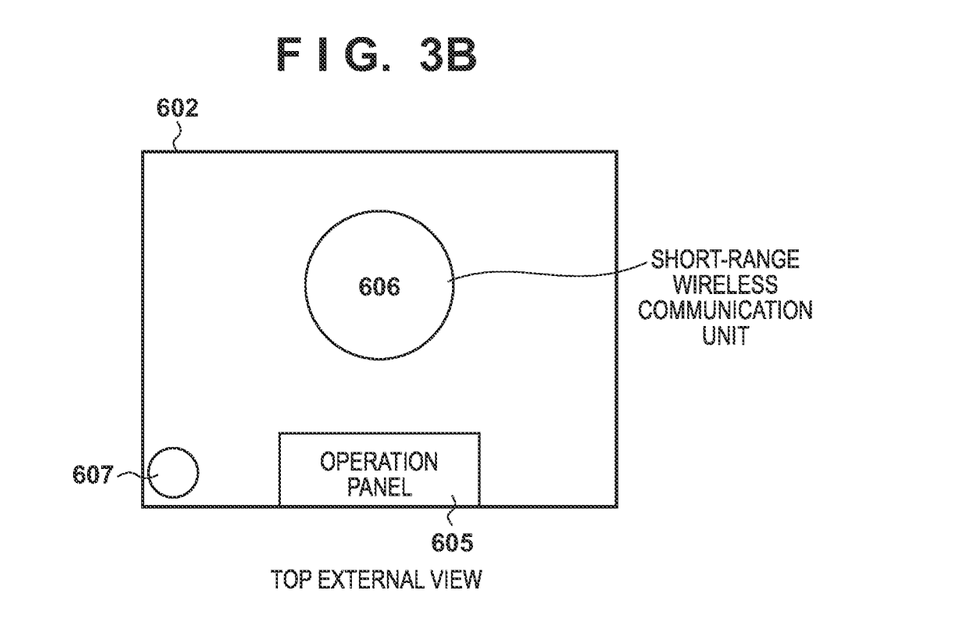

FIG. 3A and FIG. 3B are external views of the printer 600. As the printer 600, a multi-function printer (MFP) that achieves integrally a scanner and another function, for example, is used. FIG. 3A illustrates an overall external view of the printer 600. A document plate 601 is a transparent glass platform, and a document is placed thereon when performing a read by a scanner. A document cover 602 is a cover for pressing the document to the document plate so that the document does not lift up and external light does not enter the scanner unit when performing the read by the scanner. A printing sheet insertion port 603 is an insertion port for setting sheets of various sizes. The sheets that are set in the printing sheet insertion port 603 are conveyed one at a time to a printer unit (not illustrated), desired printing is performed, and the sheets are discharged from a printing sheet discharging port 604.

FIG. 3B illustrates an external view of the top face of the printer 600. On the upper portion of the document cover 602 an operation panel 605 and a short-range wireless communication unit 606 are arranged. The short-range wireless communication unit 606 is a unit for performing short-range wireless communication, and short-range wireless communication with a short-range wireless communication unit of a communication partner within a predetermined distance is possible. A wireless LAN antenna 607 is an antenna for connecting with the local area network 102 using the wireless LAN and then performing communication.

[Configuration of Printer]

Figure 4:
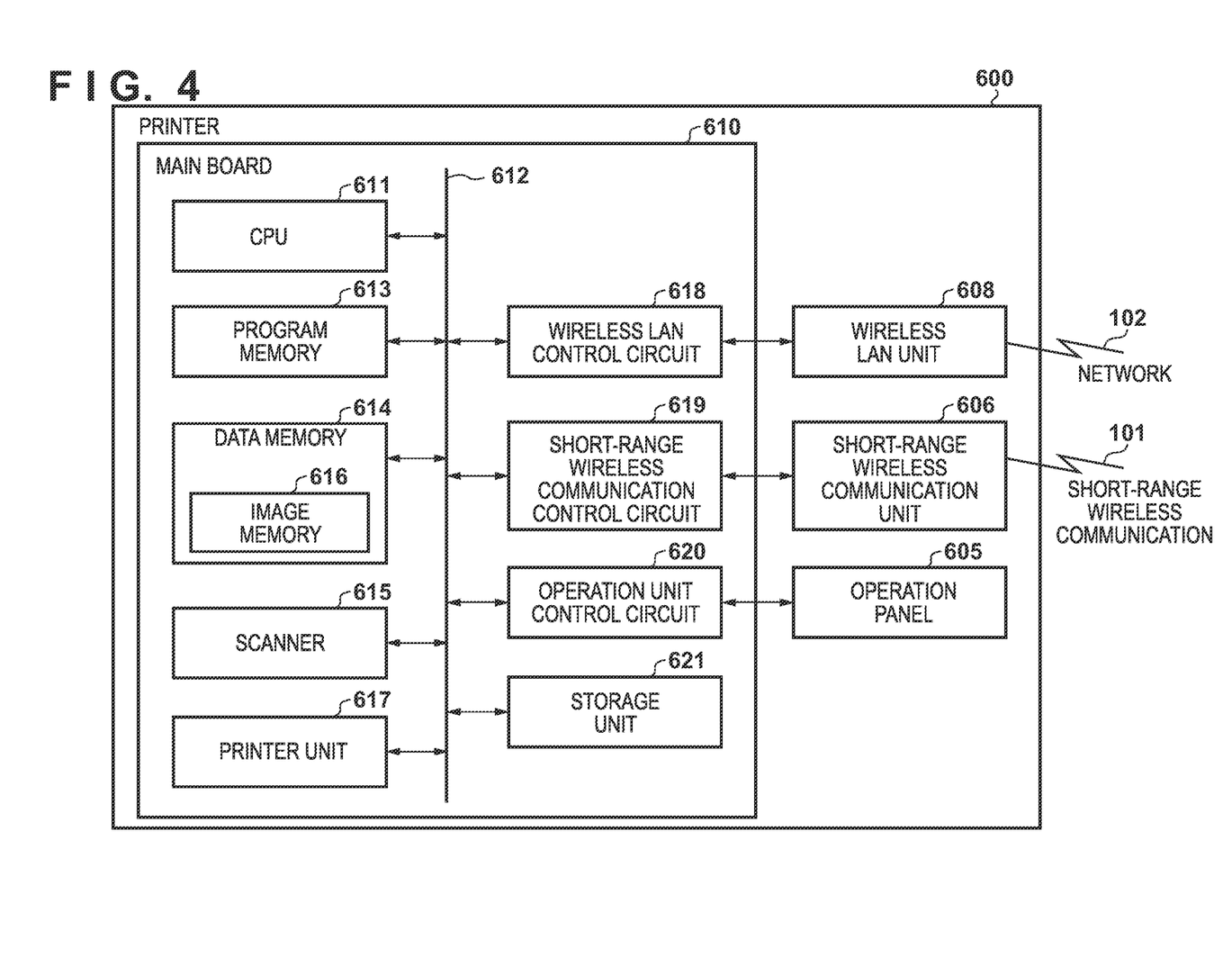
FIG. 4 is a block diagram that illustrates a configuration of a printer.

FIG. 4 is a block diagram that illustrates a configuration of the printer 600. The printer 600 includes a main board 610 that performs the comprehensive control of the device as a whole, a wireless LAN unit 608, the short-range wireless communication unit 606, and the operation panel 605. A CPU 611 in the form of a microprocessor that is arranged on the main board 610 operates based on a control program and data that are stored respectively in a program memory 613 and a data memory 614 to which the CPU 611 is connected via an internal bus 612. A program memory 613 and a data memory 614 are configured by a ROM, a RAM, and the like, for example. The operation of the printer 600 in the present embodiment is achieved by a CPU 611 executing a control program that is stored in the program memory 613 and data that is stored in the data memory 614, for example.

The CPU 611 controls a scanner unit 615 to read a document and stores the data in an image memory 616 within the data memory 614. Also, the CPU 611 prints on a recording medium such as a sheet, image data of an image memory 616 within the data memory 614 by controlling a printer unit 617. The CPU 611 performs wireless LAN communication with another communication terminal apparatus by controlling the wireless LAN unit 608 via a wireless LAN communication control unit 618. Also, the CPU 611 detects a connection with another short-range wireless communication terminal and performs the transmission/reception of data to and from another short-range wireless communication terminal by controlling the short-range wireless communication unit 606 via a short-range wireless communication control circuit 619.

The CPU 611 performs display of state displays and function selection menus of the printer 600 on an operation panel 605 by controlling an operation unit control circuit 620 and accepts operations from a user. A backlight is set in the operation panel 605, and the CPU 611 controls to turn on and off the backlight via the operation unit control circuit 620. For example, the CPU 611 controls to turn off the backlight in order to reduce the power consumption of the printer 600. A storage unit 621 stores job information of a job that was inputted into the printer 600. Job information that is stored in the storage unit 621 will be described later.

[Software Configuration]

Figure 5:
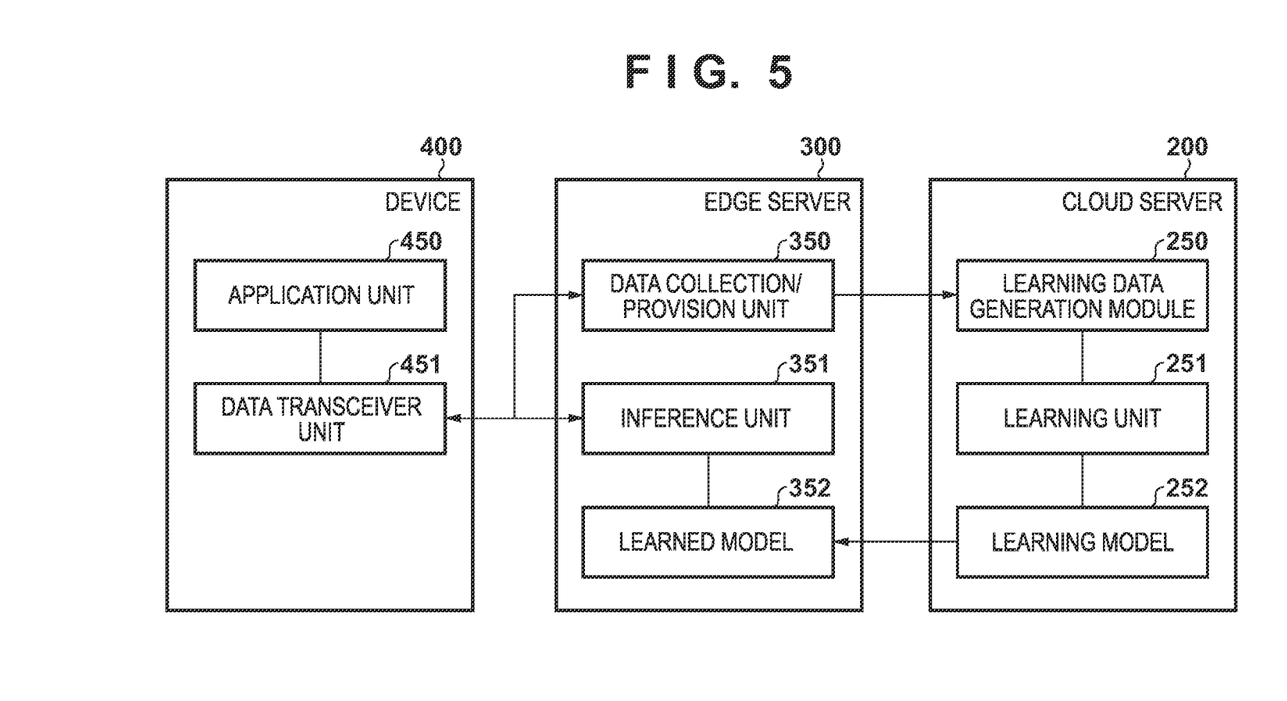
FIG. 5 is a view that illustrates a software configuration of the processing system.

FIG. 5 is a view that illustrates a software configuration of each device of the processing system 100. FIG. 5 illustrates those among a software configuration that are related to learning and inference processing in the present embodiment.

The cloud server 200 includes each module of a learning data generation unit 250, the learning unit 251, and a learning model 252 which are achieved by the CPU 211 executing a program, for example. A learning data generation unit 250 is a module that generates learning data that the learning unit 251 can process from information that was received from an external unit. Learning data is a data set of input data X of the learning model 252 and supervised data T that indicates a correct answer of a learning result. The learning unit 251 performs training using the learning data received from the learning data generation module 250 and the learning model 252. In the present embodiment, discriminative deep learning is performed using the learning model 252 that is configured as a neural network. The learning unit 251 classifies input data by optimizing combine-weighting coefficients between each node of the neural network. The learning model 252 for which learning was performed is distributed as a learned model to the edge server 300 and then used in inference in the edge server 300.

The edge server 300 includes each module of a data collection/provision unit 350, an inference unit 351, and a learned model 352 which are achieved by the CPU 211 executing a program, for example. The data collection/provision unit 350 transmits to the cloud server 200 information that was received from the device group 400 and information that was generated by the edge server 300 as information to be used in learning in the cloud server 200. The inference unit 351 executes inference using the learned model 352 based on information that is inputted via an operation unit 218. The inference unit 351 can execute inference using the learned model 352 based on information that is transmitted from the device group 400. In such a case, it is possible to transmit to the device group 400 the result of the inference thereof.

The input data X of the learned model 352 is generated from device information that is transmitted from the device group 400 or information that is inputted via the operation unit 218. The learned model 352 is used in inference that is performed in the edge server 300. The learned model 352 is configured as a neural network similarly to the learning model 252. However, the learned model 352 is generated based on the learning model 252 that was distributed from the cloud server 200. At that time, the learned model 352 may be generated based on all the layers or the unit configuration of the learning model 252 or may be generated based on a portion of a configuration among the learning model 252 that is necessary for inference in the edge server 300.

The device group 400 includes each module of an application unit 450 and a data transceiver unit 451 that are achieved by the CPU 611, for example, executing a program. The application unit 450 is a module that achieves various functions that are executed in the device group 400 and is a module that is able to use the mechanism of learning/inference by deep learning. The data transceiver unit 451 is a module that performs data transmission/reception to and from the edge server 300. In the data that is transmitted/received to and from the edge server 300, a learning or inference request that is related to the edge server 300 and information that is related to the printer usage situation which will be described later are included.

For example, the data transceiver unit 451, during learning, transmits to the data collection/provision unit 350 of the edge server 300 information that is to be used for learning in accordance with a request from the application unit 450. The above information that is related to the printer usage situation is transmitted as information that is to be used for learning. Also, during inference, information that is to be used for inference is transmitted to the edge server 300 in accordance with a request from the application unit 450, and when the result of that inference is received, the result of that inference is transferred to the application unit 450. For example, the application unit 450 of the printer 600 performs display of a screen on the operation panel 605 based on the result of inference. Also, the result of inference may be displayed on the operation unit 218 of the edge server 300.

Note that in the present embodiment, although an embodiment is described in which the learning model 252 for which learning was performed in the cloud server 200 is distributed, as the learned model 352, to the edge server 300 and then used in the inferencing, the present embodiment is not limited to such a configuration. A configuration may also be taken so as to decide, in accordance with the hardware resource distribution and calculation amount and a data communication amount, in which of the cloud server 200, the edge server 300, and a device 400 to execute each of learning and inference. Alternatively, a configuration may also be taken so as to dynamically change, in accordance with the resource distribution and calculation amount and a data communication amount, in which of the cloud server 200, the edge server 300, and a device 400 to execute each of learning and inference. By configuring the entities that perform learning and inference to be different, it becomes possible to reduce the size of a learned model that is used on the side of the device that performs inference and to accelerate processing.

[Learning Model]

Figure 6A:
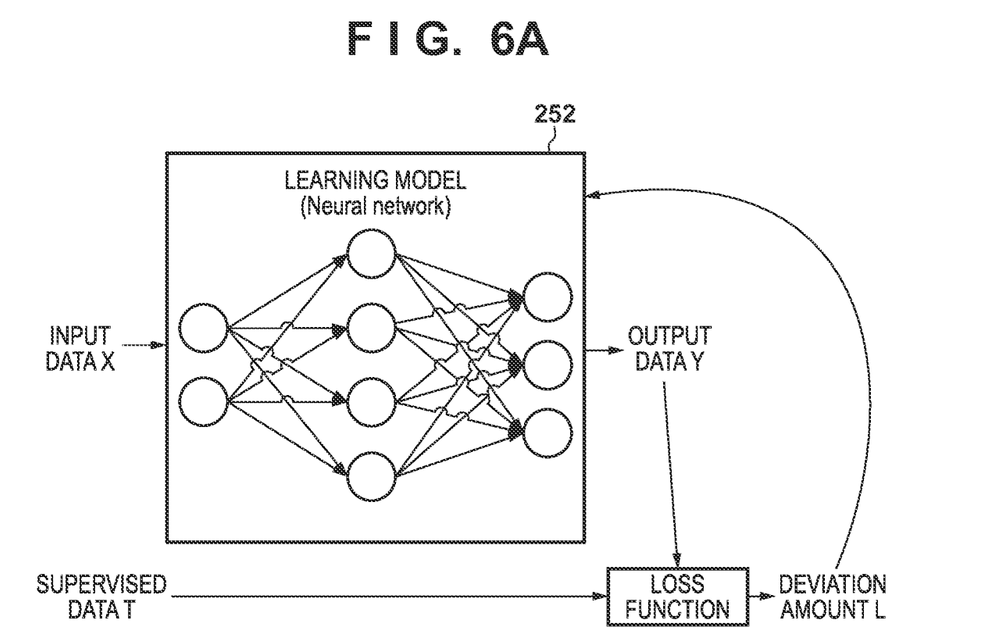
FIG. 6A and FIG. 6B are views that conceptually illustrate a learning model and a learned model.
Figure 6B:
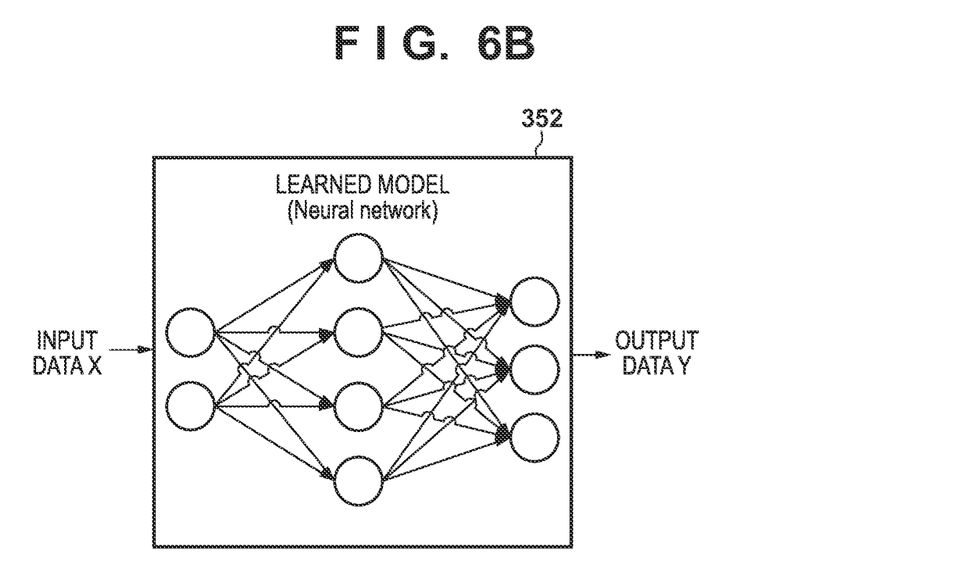

FIG. 6A and FIG. 6B are views for describing input/output data for when generating the learning model 252 and the learned model 352. FIG. 6A illustrates the relationship between the learning model 252 and the input/output data during learning. The input data X is data that is inputted into the input layer of the learning model 252. As a result of the input data X being recognized by the learning model 252, output data Y is outputted. During learning, the supervised data T is provided as correct answer data of an output result of the input data X, and a deviation amount L between the output data Y and the supervised data T is acquired from a loss function. By an error backpropagation method, a combine-weighting coefficient between the nodes of a neural network and the like that are configured as the learning model 252 are updated so that the deviation amount L becomes small. The error backpropagation method is one of the methods that adjusts a combine-weighting coefficient between the nodes of a neural network and the like so that the deviation amount L becomes small. Although in the present embodiment, the configuration of deep learning in which the neural network is used is described, another algorithm may be used in order to achieve the operation of the present embodiment. For example, the nearest neighbor method, the naive Bayes method, the decision tree, the support vector machine which are algorithms of machine learning may be used.

FIG. 6B illustrates the relationship between the learned model 352 and the input/output data during inference. The input data X is data that is inputted into the input layer of the learned model 352. As a result of the input data X being recognized by the learned model 352, output data Y is outputted. Although the learned model 352 during inference is configured as a neural network similarly to the learning model 252, it may be configured as a model for which a portion that is necessary for inference was extracted from the learning model 252. By such a configuration, it is possible to reduce the size of the learned model 352 and shorten processing time during inference.

Hereinafter, an example of a use case of the present embodiment will be described. In a use case, the cloud server 200 and the edge server 300 in FIG. 1, for example, are arranged in a consumer electronics store, for example, and the device group 400 and the router 103 are arranged in a company or a residence. Also, in this use case, the edge server 300 is connected to the Internet 104 rather than to the local area network 102. In the present embodiment, in the consumer electronics store, in addition to the printer usage situation so far of a customer that desires to purchase a new printer, purchase information (information of a purchased device) that is related to another user who, in that printer usage situation, purchased a new printer is considered.

A proposal of a new printer based only on the customer's printer usage situation so far would assume that the customer will continue the tendency of that usage situation in the future. However, in a case where a printer that has a revolutionary function has come out on the market, for example, it is expected that there will be a large number of users who will be motivated to purchase that printer even if the usage situation will be different from their printer usage situation so far. In such a case, if a proposal is made based only on the customer's printer usage situation so far, the proposed printer would not necessarily be the printer that has the above revolutionary function and may not be an appropriate proposal for the customer.

Accordingly, the present embodiment, based on a customer's printer usage situation so far and purchase information that is related to other users who, in that printer usage situation, purchased a new printer, and proposes a new printer to the customer. By virtue of such a configuration, it is possible to achieve a more appropriate proposal in which a current product trend is reflected when proposing a printer to a customer.

Figure 7:
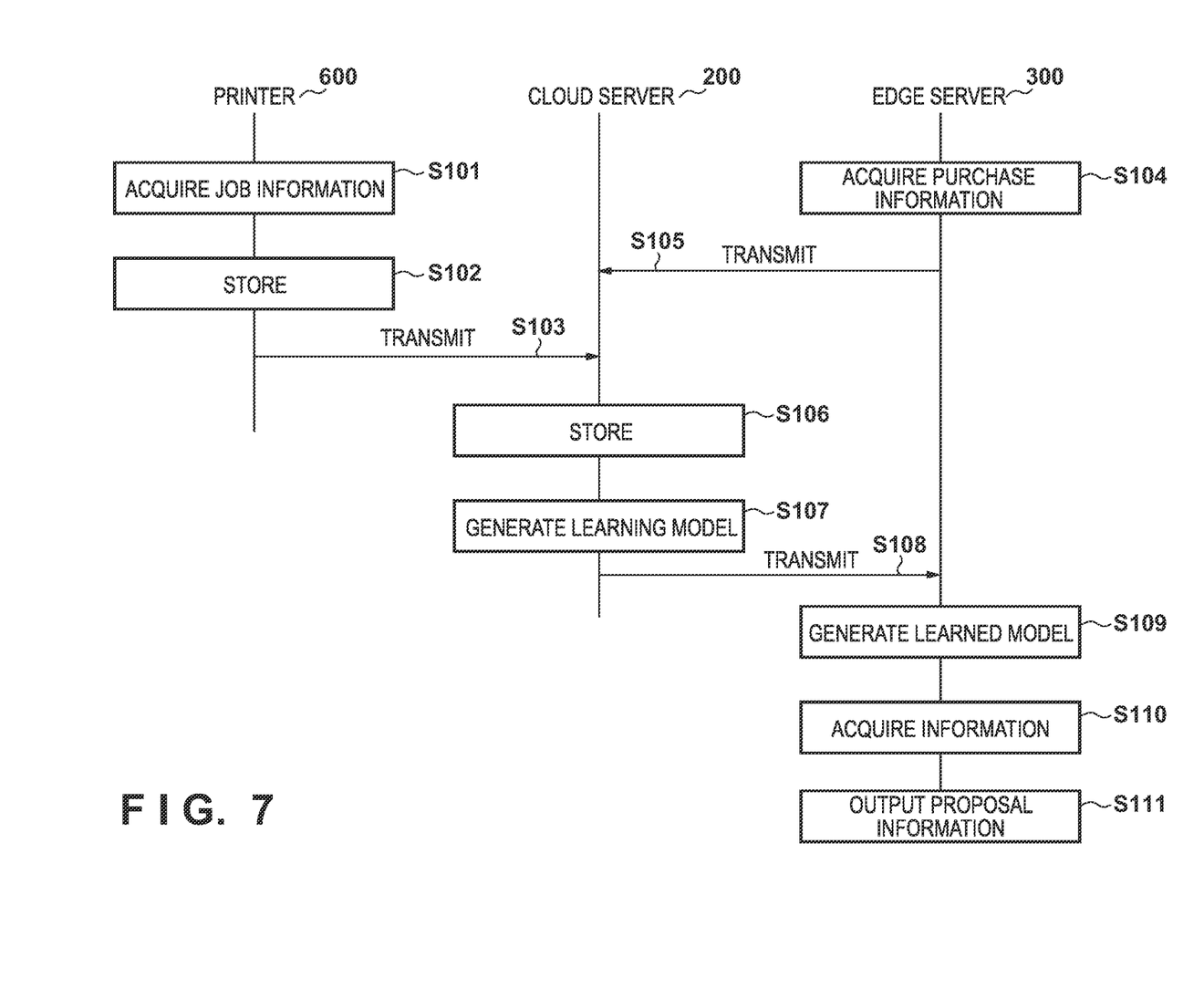
FIG. 7 is a view that illustrates a process of a processing system.

FIG. 7 is a flowchart that illustrates processing that is executed in the processing system of the present embodiment. Hereinafter, an operation of a processing system of the present embodiment will be described while referring to FIG. 7. The processing of the printer 600 in FIG. 7 is achieved by the CPU 611 executing a program that was stored in the program memory 613, for example. Also, each of the processes of the cloud server 200 and the edge server 300 is achieved by the CPU 211 or the GPU 217 of each device (GPU 217 in the description below) executing a program that was stored in the program memory 213. Note that the user of the printer 600 is in a state in which he/she is registered as a user in the present processing system by an application that is provided from the cloud server 200 and the like.

In step S101, the CPU 611 of the printer 600, when an execution of printing is instructed, acquires job information from the print job. Here, a case where printing is instructed includes a case where printing is instructed on the operation panel 605 of the printer 600, a case where a print job is received via the short-range wireless communication unit 606, and a case where a print job is received via the wireless LAN unit 608. In other words, print jobs include a print job that was generated within the printer 600 and a print job that was received from a unit outside of the printer 600. Job information is what is set in a print job and includes monochrome/color printing, the number of printed sheets, information of a print sheet, transmission source information of a print job, date and time information, user information, and printer identification information, for example. In step S102, the CPU 611 stores to the storage unit 621 the job information that was acquired in step S101. At that time, the job information may be grouped by user and then stored. By the processing in steps S101 and S102, job information that was acquired from a print job that was executed by the printer 600 will be accumulated in the storage unit 621 of the printer 600.

In step S103, the CPU 611, at a predetermined timing such as when one month has elapsed, for example, acquires information that is related to the printer usage situation based on job information that was accumulated in the storage unit 621. Then, the CPU 611 transmits to the cloud server 200 the acquired information that is related to the printer usage situation. At that time, the information that is related to the printer usage situation is transmitted together with printer identification information such as the model name of the printer 600 and user information. The information that is related to the printer usage situation is information that is aggregated from job information and includes the following information, for example.

(1) Ratio of printing between monochrome printing and color printing
(2) Number of printed sheets within a preset period
(3) Information that is related to a position from which printing was instructed
(4) Information of a print sheet Information (1) is a ratio between monochrome printing and color printing in a predetermined period in the past. Information (2) is a total number of printed sheets in a predetermined period in the past. Information (3) is acquired from the transmission source information of a print job and is a ratio between a print job that was instructed on the printer 600, for example, and a print job that was instructed from a unit outside the printer 600 such as a portable terminal. Information (4) is information of a print sheet and is a ratio at which photograph paper was used, for example. Note that the information that is related to the printer usage situation may be transmitted to the cloud server 200 via the edge server 300.

As described above, in the present embodiment, the cloud server 200 regularly collects from the printer 600 the information that is related to the printer usage situation as input data X for generating the learning model 252.

On the other hand of steps S101 to S103, in step S104, the GPU 217 of the edge server 300 acquires purchased printer information, which is of a printer that was actually purchased at a consumer electronics store at which the edge server 300 is arranged, and buyer information which is of the buyer thereof. Purchased printer information is a model name, for example, and is sales performance information of sales made on the store side. Also, buyer information, in a case where the buyer is already registered as a user in the present processing system, is identification information of the buyer. Meanwhile, there may be a case where the buyer is not registered as a user in the present processing system. In such a case, a configuration may also be taken so that the buyer inputs into the operation unit of the edge server 300, by a method such as a survey, the information that is related to the above information (1) to (4) regarding the printer that he/she has been using so far. Also, a configuration may be taken so that at that time, information that is different from the information of the input data X such as information that is related to a function of a printer that a customer desires is inputted.

In step S105, the GPU 217 of the edge server 300 transmits to the cloud server 200 purchase information that includes the purchased printer information and the buyer information that were acquired in step S104. At that time, identification information that is used within the present processing system such as an ID number is transmitted as the buyer information. In a case where the buyer is not registered as a user in the present processing system, the above inputted information and the purchased printer information are transmitted to the cloud server 200 as the purchase information.

As described above, in the present embodiment, the cloud server 200 collects from the edge server 300 the purchase information as the supervised data T for generating the learning model 252. Note that although in FIG. 7, step S103 is illustrated to be at a timing after step S105, the timing may be reversed.

In step S106, the GPU 217 of the cloud server 200 receives the information that is related to the printer usage situation that was transmitted in step S103, associates that information with the user information and the printer identification information and then stores that information in a storage region of the hard disk unit 202 and the like. Also, the GPU 217 of the cloud server 200 receives and then stores the purchase information that was transmitted in step S105 in a storage region of the hard disk unit 202 and the like.

In step S107, the GPU 217 of the cloud server 200 generates a learning data set that consists of the input data X and the supervised data T. In the generation of a learning data set, the information that is related to the printer usage situation and the purchased printer information based on user information, for example, are a learning data set. For example, assume a case where a user A who is using a printer A purchases a new printer B at a consumer electronics store at which the edge server 300 is set. In such a case, the information that is related to the printer usage situation (printer A) that corresponds to the user information that is transmitted in step S103 and the purchased printer information (printer B) that is transmitted in step S104 are generated as a learning data set. Also, in a case where the buyer is not registered as a user in the present processing system, the input information (information that is related to the printer usage situation inputted in step S104) that was transmitted in step S105 and the purchased printer information are generated as a learning data set.

In step S107, the GPU 217 of the cloud server 200 uses the generated learning data set to generate the learning model 252. In step S108, the GPU 217 of the cloud server 200 transmits to the edge server 300 the generated learning model 252. At that time, as described above, a portion of the generated learning model 252 may be transmitted to the edge server 300. In step S109, the GPU 217 of the edge server 300 uses the transmitted learning model 252 to generate the learned model 352.

As described above, in the generation of the learning model 252 and the learned model 352 in the present embodiment, the purchased printer information which is of a printer that was actually purchased based on the printer usage situation is used as the supervised data T. Accordingly, in an inference that uses the learned model 352, the more that there is a trend for the current product that buyers of a printer in which a revolutionary new feature is implemented, for example, the higher the tendency that the information of that printer is outputted.

In step S110, the GPU 217 of the edge server 300 acquires information from a customer. The information that is acquired from a customer is the information that is related to the usage situation of the customer's current printer and is information such as the above information (1) to (4), for example. For example, a configuration may also be taken so as to accept information from a customer via the operation unit of the edge server 300. Also, in a case where the customer is already registered as a user in the present processing system, a configuration may be taken so as to accept the identification information of the customer. Also, a configuration may also be taken so as to accept identification information of a printer that the customer is currently using. In either case, information that is related to the printer usage situation is requested in relation to the cloud server 200 based on the identification information of a customer or the identification information of a printer. The GPU 217 of the cloud server 200 transmits to the edge server 300 the requested identification information of a customer or information that is related to the printer usage situation which is associated with the identification information of a printer. Then, the GPU 217 of the edge server 300 acquires the information that is related to the printer usage situation that was transmitted from the cloud server 200.

In step S111, the GPU 217 of the edge server 300 inputs into the learned model 352 the information acquired in step S110 and then performs inference. Then, the GPU 217 of the edge server 300, as a result of inference, outputs as proposal information the printer information that is classified to be in the highest probability. For example, a configuration may also be taken such that the proposal information is displayed on the operation unit 218 of the edge server 300.

As described above, in the present embodiment, the generation of the learning model 252 and the learned model 352 is being performed using the information (1). Accordingly, it is possible to propose appropriately the purchasing of a color device or a monochrome printer based on the ratio between monochrome printing and color printing so far of a customer, for example.

Also, the generation of the learning model 252 and the learned model 352 is being performed using the information (2). Accordingly, it is possible to propose appropriately the purchasing of a printer on which a normal ink tank is provided or a printer on which a large-volume ink tank is provided based on the number of printed sheets for which printing was performed so far of the customer, for example. Note that a printer on which a large-volume ink tank is provided is a continuous ink supply system (CISS) printer, for example.

Also, the generation of the learning model 252 and the learned model 352 is being performed using the information (3). Accordingly, it is possible to propose as appropriate the purchasing of a printer whose coordination with a portable terminal is superior in a case where it is determined that a print instruction is often performed from a portable terminal based on positions from where the customer performed a print instruction so far, for example.

Also, the generation of the learning model 252 and the learned model 352 is being performed using the information (4). Accordingly, it is possible to propose as appropriate the purchasing of a printer whose image quality is high in a case where it is determined that a ratio of photography printing is high based on the information of print sheets on which the customer performed printing so far, for example. Also, it is possible to propose as appropriate a printer on which dye-based ink is provided or a printer on which pigment-based ink is provided in accordance with the respective ratios of document printing and photography printing, for example.

Furthermore, in the present embodiment, because the purchased printer information which is of a printer that was actually purchased based on the printer usage situation is used as the supervised data T, in addition to the above advantages, it is possible to reflect the current trend of products. Also, it is possible to propose in relation to the customer a new product that is similar to the model that was purchased by a person whose usage situation is very similar to that of the customer. As a result, it becomes possible to prevent the customer from mistakenly purchasing a model that does not suit the usage situation of the customer.

In the present embodiment, although the information (1) to (4) is described as information that is used as the input data X and is acquired in step S110, the information is not limited to those and other information may be used. For example, a configuration may also be taken so as to use as the input data X price information of a printer that is currently being used. By such a configuration, it becomes possible to propose as appropriate the purchasing of a product in which the price range of a printer that the customer is currently using is reflected.

Also, although the information (1) to (4) that corresponds to the input data X is described as information that is acquired in step S110, information that is acquired in step S110 and information that corresponds to the input data X may be different. For example, a configuration may also be taken so as to acquire a feature that the customer desires in the future or information of an expected printer usage situation in the future as information that is acquired in step S110. By such a configuration, even if a change were to occur to the usage situation of a customer in the future, it becomes possible to propose a new product that considers that change. In such a case, it is possible to propose a new product based on the information of other users who are using a printer that has a feature that the customer would want in the future, for example.

Also, it was described that the information that is related to the printer usage situation is transmitted to the cloud server 200 without involving a user operation in step S103. However, the information that is related to the printer usage situation may be transmitted to the cloud server 200 by another method. For example, a configuration may also be taken so as to transmit by a user operation to the cloud server 200 via the operation panel 605 of the printer 600 or on an application on a portable terminal.

Also, in the present embodiment, it was described that in step S111, the printer information that is classified to be in the highest probability as a result of inference is outputted as proposal information. However, regarding the classification result, in a case where there is a printer of a manufacturer that is the same as that of the printer that the customer is currently using, for example, a configuration may also be taken to output that printer information with priority as proposal information. By such a configuration, the possibility that a manufacturer will have its printer purchased again will increase, and also, for the customer, because a printer that is of the same manufacturer which he/she has been using so far and trusts will be presented with priority, there will be less concern, and thus it is expected that the motivation to purchase will increase.

Also, for the customer, because a recommended model will be proposed by the present processing system, the customer will have less difficulty in deciding which product to buy, and thus it becomes possible to reduce the burden on the customer. Also, because the store clerk of a consumer electronics store will be able to sell goods based on clear grounds (data), it becomes possible to reduce sales behavior biased by emotion.

Also, in the present embodiment, an example of a case where the edge server 300 is set in the consumer electronics store and the customer that visits the store purchases a printer is described. However, the operation of the present embodiment can also be applied to a case where the customer purchases a printer on a website that is provided by the edge server 300 and the like. For example, a new product can be proposed similarly to the present embodiment by the customer inputting an identification number of the printer that he/she is currently using, and the like, on a pregenerated website that is linked with the learned model 352, and the like.

Also, in the present embodiment, although a configuration that proposes a printer was described, it is not limited to a printer and may be another device. For example, it may be a device such as a camera and a smartphone or a home electric appliance such as a television. In such a case the information (1) to (4) is sufficient as long as the information is related to the usage situation of each device such as a shooting frequency, television viewing time, and the like. Also, the transmission in step S103 does not have to be a transmission from a device and in a case of a smart house, for example, a configuration may be taken so as to detect behavior, tendency, and the like of a device or a resident by a sensor and the like and then transmit the result as IoT (Internet of Things) data.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-229382, filed Dec. 19, 2019, which is hereby incorporated by reference herein in its entirety.

What is claimed is:

1. A proposal system, comprising:
a first processing circuit including at least one processor; and at least one memory; and
a second processing circuit including at least one processor and at least one memory,
the at least one memory of the first processing circuit storing instructions that, when executed by the at least one processor of the first processing circuit, cause the first processing circuit to:
receive information related to a printer usage situation;
receive purchased printer information;
train a learning model using supervised data and at least the information related to a printer usage situation and the purchased printer information as learning data; and
transmit at least a portion of the learning model to the second processing circuit; and
the at least one memory of the second processing circuit storing instructions that, when executed by the at least one processor of the second processing circuit, cause the second processing circuit to
receive the at least a portion of the learning model from the first processing circuit;
acquire sales performance information of sales related to a purchased device made on a store;
generate a learned model using the at least a portion of the learning model, wherein the learned model is generated using at least training data corresponding to a trend of a product and wherein the learned model has a smaller size than the learning model;
accept information that is related to a usage situation of a user printer from a customer;
infer a purchase target device using the learned model, based on the information that is related to the usage situation of the user printer that was accepted from the customer and the sales performance information that was acquired; and
output as proposal information a result of the inference, wherein
the output proposal information preferentially outputs the result of the inference regarding a printer whose manufacturer is the same as that of a printer which was previously used by the customer.

2. The proposal system according to claim 1, wherein the proposal system comprises a first server and a second server,
the first server includes the second processing circuit, and
the second server includes the first processing circuit, and
wherein the first processing circuit is further configured to update the learned model.

3. The proposal system according to claim 2, wherein the first processing circuit updates the learned model by updating the learning model.

4. The proposal system according to claim 3, wherein the information that is related to the printer usage situation that is received by the first processing circuit and the information that is related to the usage situation of the user printer that is accepted by the second processing circuit are different.

5. The proposal system according to claim 4, wherein the accepted information that is related to a usage situation of the user printer is received from the user printer.

6. The proposal system according to claim 3, wherein the first server further includes
a transmitter to transmit to the second server the acquired sales performance information that was acquired by the first acquisition unit.

7. The proposal system according to claim 3, wherein the learned model and the learning model are neural networks.

8. The proposal system according to claim 1, wherein the information that is related to the usage situation of the user printer includes at least one of a ratio between monochrome printing and color printing, a number of printed sheets, information that is related to a position from which printing was instructed, and information of a print sheet.

9. The proposal system according to claim 8, wherein the information that is related to the usage situation of the user printer device includes price information.

10. The proposal system according to claim 8, wherein the information that is related to the usage situation of the user printer includes information of a function that the customer desires.

11. A method that is executed in a proposal system having a first processing circuit and a second processing circuit, the method comprising:
in the first processing circuit,
receiving information related to a printer usage situation;
receiving purchased printer information;
training a learning model using supervised data and at least the information related to a printer usage situation and the purchased printer information as learning data; and
transmitting at least a portion of the learning model to the second processing circuit; and
in the second processing circuit,
receiving the at least a portion of the learning model from the first processing circuit;
acquiring sales performance information of sales related to a purchased device made on a store;
generating a learned model using the at least a portion of the learning model, wherein the learned model is generated using at least training data corresponding to a trend of a product and wherein the learned model has a smaller size than the learning model;
accepting information that is related to a usage situation of a user printer from a customer;
inferring a purchase target device using the learned model, based on the accepted information that is related to the usage situation of the user printer and the acquired sales performance information; and outputting as proposal information a result of the inference, wherein the outputting preferentially outputs the result of the inference in the inferring regarding a printer whose manufacturer is the same as that of a printer which was previously used by the customer.

12. A non-transitory computer-readable storage medium that stores a program for causing a proposal system having a first processing circuit and a second processing circuit to perform a method comprising:

in the first processing circuit,
receiving information related to a printer usage situation;
receiving purchased printer information;
training a learning model using supervised data and at least the information related to a printer usage situation and the purchased printer information as learning data; and
transmitting at least a portion of the learning model to the second processing circuit; and in the second processing circuit,
receiving the at least a portion of the learning model from the first processing circuit;
acquiring sales performance information of sales related to a purchased device made on a store;
generating a learned model using the at least a portion of the learning model, wherein the learned model is generated using at least training data corresponding to a trend of a product and wherein the learned model has a smaller size than the learning model;
accepting information that is related to a usage situation of a user printer from a customer;
inferring a purchase target device using the learned model, based on the accepted information that is related to the usage situation of the user printer and the acquired sales performance information; and outputting as proposal information a result of the inference, wherein the outputting preferentially outputs the result of the inference in the inferring regarding a printer whose manufacturer is the same as that of a printer which was previously used by the customer.

* * * * *